May 5, 1970  W. H. O'CONNOR III  3,510,708
MODULAR BRUSH HOLDER ASSEMBLY
Filed Sept. 25, 1968
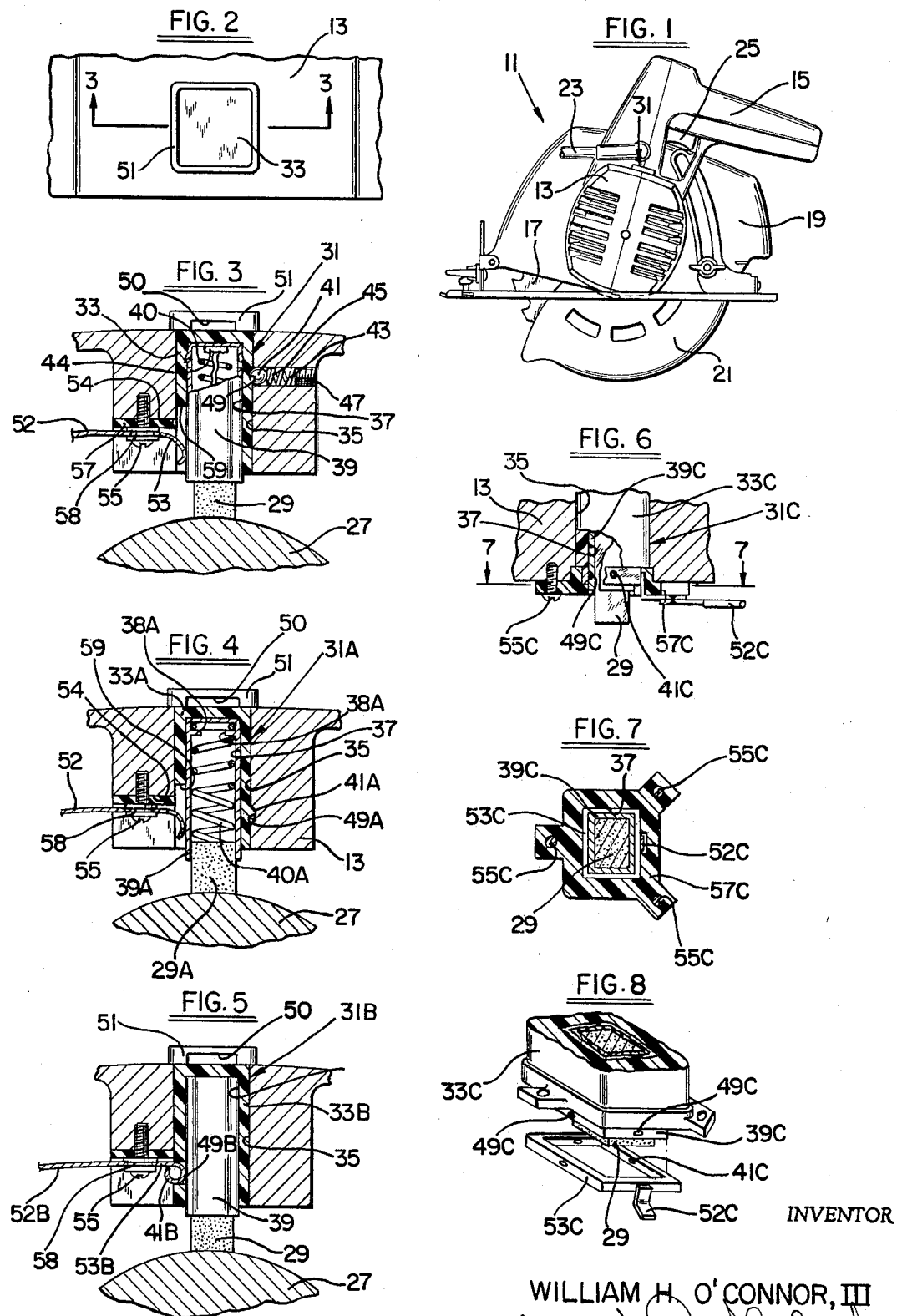
INVENTOR
WILLIAM H. O'CONNOR, III
BY
ATTORNEY

United States Patent Office 3,510,708
Patented May 5, 1970

3,510,708
MODULAR BRUSH HOLDER ASSEMBLY
William H. O'Connor III, Baltimore, Md., assignor to
The Black and Decker Manufacturing Company, Towson, Md., a corporation of Maryland
Filed Sept. 25, 1968, Ser. No. 762,503
Int. Cl. H01r *39/38*
U.S. Cl. 310—242                                   15 Claims

ABSTRACT OF THE DISCLOSURE

The device disclosed herein is a brush holder assembly for use in an electric motor device. The assembly includes an insulating outer body which houses a conductive insert, a carbon brush and a spring. The assembly is removably secured in place on a motor housing and, when in place, the insert makes electrical contact with the internal circuitry of the electric motor device.

Summary of the invention

The present invention is directed to a modular-type electric motor brush holder assembly which is readily mounted in place on or removed from a motor housing without the need for special tools. In addition, when the brush holder assembly is in place on the housing, electrical contact is made with the internal circuitry of the motor.

Main objects of the invention, therefore, are to provide a novel, modular-type, brush holder assembly which is readily incorporated in and removable from an electric motor device without requiring special tools, and which, when incorporated, establishes electrical contact with the motor circuitry.

Further objects of the present invention are to provide a novel, modular brush holder assembly of the above character which is safe and which is relatively inexpensive to manufacture, rugged in construction and reliable in use.

Other objects and advantages of the present invention will become more apparent from a consideration of the detailed description to follow taken in conjunction with the drawings appended hereto.

Brief description of the drawings

FIG. 1 is an elevational view illustrating a portable electric tool embodying the present invention;

FIG. 2 is an enlarged, fragmentary plan view illustrating the brush holder assembly of the present invention in place;

FIG. 3 is a sectional view of FIG. 2 taken along the line 3—3 thereof and illustrating a preferred form of the invention;

FIG. 4 is a view similar to FIG. 3 but illustrating a modified form of the invention;

FIG. 5 is a view similar to FIGS. 3 and 4 but illustrating still another form of the invention;

FIG. 6 is a sectional view, similar to FIGS. 3–5, and illustrating still another modified form of the invention;

FIG. 7 is an enlarged sectional view of FIG. 6 taken along the line 7—7 thereof; and FIG. 8 is an exploded perspective view of a portion of the structure of FIGS. 6 and 7.

Broad statement of the invention

Broadly described, the present invention relates to an electric motor device comprising a housing adapted to encase an electric motor, said motor including rotatable commutator means; the improvement in said motor device, which comprises a brush holder assembly supported upon said housing, said brush holder assembly means including a hollow insulating body having a conductive insert therein, a brush slidably retained in said body and in engagement with said conductive insert, said housing having an opening therethrough adjacent said commutator means, said opening being adapted to receive said insulating body, electrical conductor means in said housing and adjacent said opening, said conductor means engaging said insert means on said body when said body is in place in said opening, and manually releasable detent means securing said body in place within said opening.

In another aspect, the present invention relates to a modular brush holder assembly comprising a hollow insulating body, a conductive insert within said body, a carbon brush slidably retained within said body and in engagement with said insert, said insert having a portion thereof exposed for engagement with electrical conductor means, and manually releasable detent means on said assembly adapted to releasably hold said assembly in place on a motor housing.

Detailed description

Referring now more specifically to the drawings, there is illustrated in FIG. 1 a portable electric saw 11 which is one type of electric motor device in which the present invention finds use. However, it is to be understood that this device is illustrative only and that the present invention finds use in the general class of electric motors and motor devices employing brush-type commutation.

With this in mind, the saw 11 is seen to include a motor housing 13 having a handle 15 fixed thereto or integral therewith. An electric motor (not shown) is disposed within the housing 13 and powers a rotatable saw blade 17 which is protected by a stationary guard 19 and a retractable guard 21. Electric current is supplied to the motor through a line cord 23 and is controlled by a trigger switch 25 mounted on the handle 15.

The motor (not shown) includes a commutator 27 (FIG. 3) to which electric current is transmitted by carbon brushes 29 (only one of which is shown). A novel modular brush holder assembly 31 houses each of the brushes 29 and is removably secured to the housing 13 in a novel fashion hereinafter described.

Thus, as shown in FIG. 3, the brush holder assembly 31 includes a hollow elongated body 33 preferably constructed from a rigid insulating material and which is snugly but slidably received in an aperture 35 formed in the housing 13. A cavity 37 in the body extends inwardly from one end thereof and has a conductive metal sleeve 39 pressed therein. The carbon brush 29 is slidable within the sleeve 39 and a spring 40 behind the brush 29 holds it engaged with the commutator 27. A shunt wire 42 embedded in the brush 29 extends through the spring 40 and is fixed to a cap 44 which, in turn, is soldered to the insert 39.

According to the present invention, the brush holder assembly 31 is retained in place within the housing aperture 35 by detent means, and, when so placed, the brush 29 is electrically connected to the internal circuitry within the housing 13.

To this end, a detent ball 41 is slidably retained in an opening 43 and is pressed partly into the aperture 35 by a compression spring 45 held in place by a set screw 47. The brush holder body 33 has a detent indentation 49 adapted to partly receive the ball 41 when the body 33 is fully inserted in the aperture 35. The brush holder body 33 is securely retained in the aperture 35 but is readily removable therefrom by grasping an enlarged end 51, on the outer end of the body 33, and pulling outwardly thereon. Alternatively, the enlarged end 51 may be slotted, as at 52, to receive the end of a prying tool such as a screwdriver to facilitate removal of the assembly. Thus, when it is desired to inspect and/or replace the brush 29, one may quickly and easily do so without the need for special tools or skill.

In addition, as shown in FIG. 3, an electrical conductor 52, forming part of the internal circuitry of the motor, is held in place within a recess 54 on the housing 13 by a screw 55 and is insulated from the housing by insulating material 57 and from the screw 55 by a non-conductive bushing 58. The conductor 52 has a resilient, spring like end 53 extends into the aperture 35 and engages the metal insert 39 in the body 33 when the latter is in place in the aperture 35. To this end, the body 33 is slotted at 59 to expose the insert 39 to the conductor end 53 and the latter is bent as shown to permit easy sliding of the insert 39 relative thereto while insuring firm electrical contact therewith.

It will be seen, therefore, that the modular brush holder assembly 31 of the present invention is readily inserted and removed from the housing 13, without special tools or skills, to facilitate ready inspection and/or replacement of the brushes 29. The detent arrangement 41, 49 secures the assembly in place and the electrical connection afforded by means 53, 39, 44, 42 is safe and sure, and again, requires no special tools or skill to make or break.

A modified form of modular brush holder assembly is shown at 31A in FIG. 4. Here, the detent means for holding the assembly 31A in place includes an integral projection 41A on the brush holder body 33A which is received in an indentation 49A in the wall of aperture 35A. In addition, instead of a shunt-type arrangement, the brush 29A is secured in place within the body 33A by the spring 40A which has one end fixed to the brush 29A while the other end is trapped behind tabs 38A on the insert 39A. Further, the resilient nature of the conductor end 53 helps hold the projection 41A in place in the indentation 49A. In all other respects, the structure of FIG. 4 is the same as that shown in FIG. 3 and like numerals refer to like parts.

FIG. 5 illustrates another modified form of modular brush holder assembly depicted as 31B. Here, the electrical conductor 52B doubles as part of the detent means. As shown, the end 53B of the conductor 52B is rolled back on itself forming a detent loop 41B adapted to be received in a detent slot 49B in the brush holder body 33B. In addition, the loop 41B engages the metallic insert 39 when so positioned and therefore is electrically connected to the brush 29. Again special tools or skills are not required to insert and remove the assembly 31B from the housing aperture 35 and the electrical contact is automatically made with the conductor 52B when the body 33B is in place in the aperture 35.

Still another modified form of the invention is illustrated in FIGS. 6–8. Here, the metallic insert 39C of the modular brush holder assembly 31C is provided with indentations 49C which receive generally complementary shaped, spring-like projections 41C formed on a metallic band 53C. An insulating member 57C is fixed to the housing 13 around the aperture 35 by screws 55C and holds the band 53C in place within the aperture 35 so that when the body 33C is in place within the aperture 35, the insert 39C fits in the band 53C and the indentations 49C receive the projections 41C. In addition, the band 53C is fixed to the end of an electrical conductor 52C so that the brush 29 is connected to the motor circuitry and the modular assembly 31C is removably retained in the aperture 35. In all other respects, this embodiment is like those illustrated in FIGS. 1–3, FIG. 4, and FIG. 5.

By the foregoing, there has been disclosed a novel modular brush holder assembly calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

I claim:
1. An electric motor device comprising a housing adapted to encase an electric motor, said motor including rotatable commutator means; the improvement in said motor device, which comprises a brush holder assembly supported upon said housing, said brush holder assembly means including a hollow insulating body having a conductive insert therein, a brush slidably retained in said body and in engagement with said conductive insert, said housing having an opening therethrough adjacent said commutator means, said opening being adapted to receive said insulating body, electrical conductor means in said housing and adjacent said opening, said conductor means engaging said insert means on said body when said body is in place in said opening, and manually releasable detent means securing said body in place within said opening.

2. A device as defined in claim 1 wherein said detent means are provided on said brush holder assembly and said housing, respectively.

3. A device as defined in claim 1 wherein said conductor means includes a spring-like member which snugly engages said insert when said body is in place within said opening.

4. A device as defined in claim 2 wherein said detent means includes a spring pressed ball in said housing cooperable with a recess in said body.

5. A device as defined in claim 2 wherein said detent means includes an integral projection on said body adapted to be received in a recess in said housing.

6. A device as defined in claim 2 wherein said detent means comprises a terminal end of said conductor means cooperable with a slot in said body.

7. A device as defined in claim 2 wherein said detent means comprises a band fixed to said housing and adapter to receive a portion of said insert when said body is in place within said opening, said band and said insert having cooperable projections and indentations.

8. A device as defined in claim 7 wherein said band is metallic and forms a part of said conductor means.

9. A device as defined in claim 3 wherein said body has a slot therein exposing said insert for engagement with said spring-like member.

10. A modular brush holder assembly comprising a hollow insulating body, a conductive insert within said body, a carbon brush slidably retained within said body and in engagement with said insert, said insert having a portion thereof exposed for engagement with electrical conductor means, and manually releasable detent means on said assembly adapted to releasably hold said assembly in place on a motor housing.

11. An assembly as defined in claim 10 wherein said body has a slot therein exposing said insert portion.

12. An assembly as defined in claim 10 wherein said detent means comprised a recess in said body.

13. An assembly as defined in claim 10 wherein said detent means comprises a projection on said body.

14. An assembly as defined in claim 10 wherein said detent means comprises said slot.

15. An assembly as defined in claim 10 wherein said detent means comprises identations formed in said insert.

References Cited
UNITED STATES PATENTS

| | | | |
|---|---|---|---|
| 1,751,462 | 3/1930 | Baker | 310—247 |
| 2,194,620 | 3/1940 | Sekyra | 310—247 |
| 2,773,209 | 12/1956 | Kirkwood | 310—247 |
| 2,794,139 | 5/1957 | Horner | 310—239 |
| 3,436,576 | 4/1969 | Klebe | 310—247 |

MILTON O. HIRSHFIELD, Primary Examiner

L. L. SMITH, Assistant Examiner

U.S. Cl. X.R.

310—247